C. O. VANTREASE.
RESILIENT WHEEL.
APPLICATION FILED AUG. 13, 1913.
1,097,829.
Patented May 26, 1914.
2 SHEETS—SHEET 1.
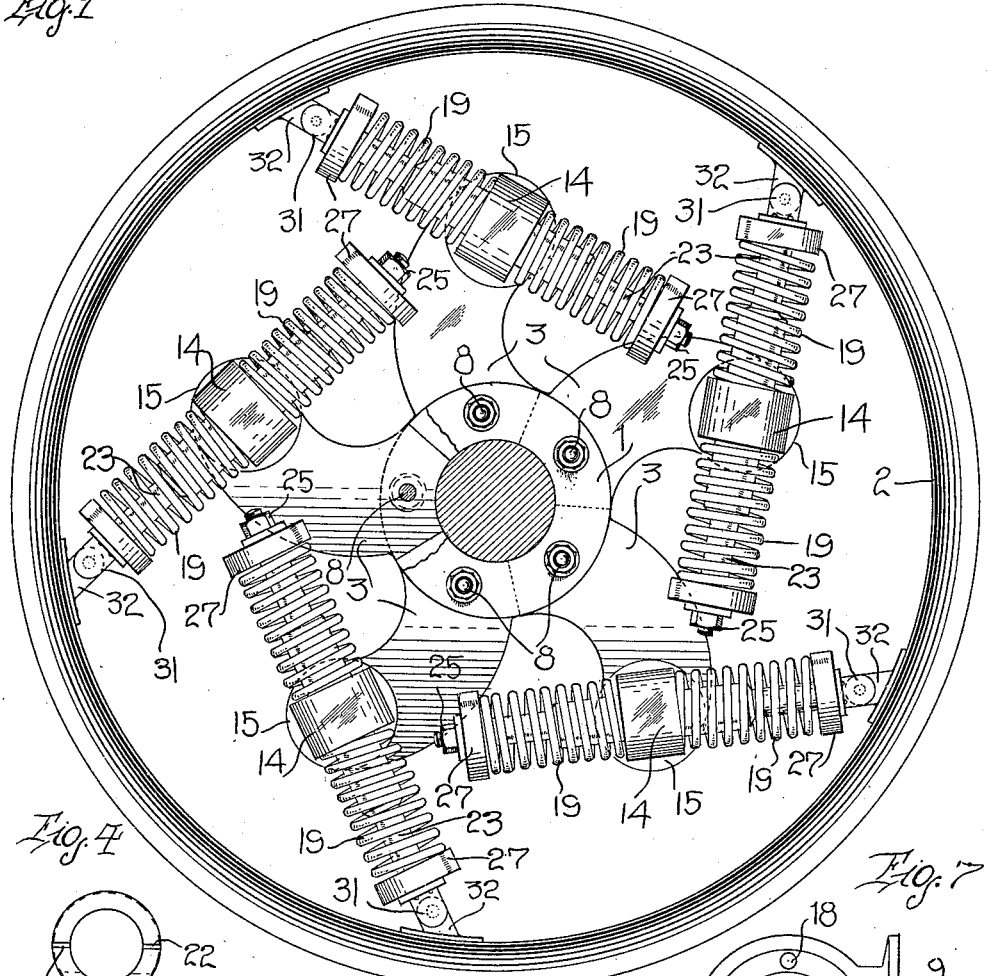
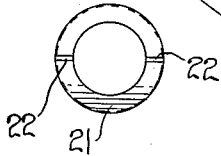
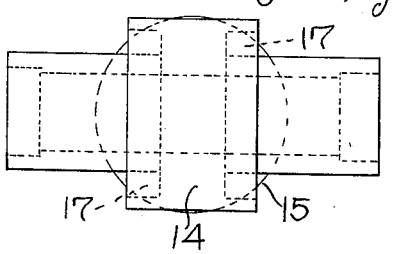
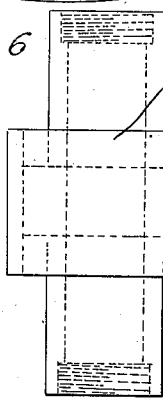
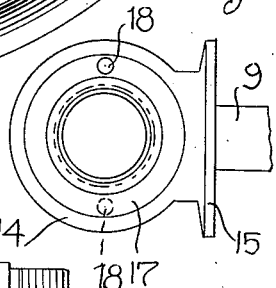
Inventor
CLARENCE ODUM VANTREASE
Witnesses
By Watson E. Coleman
Attorney

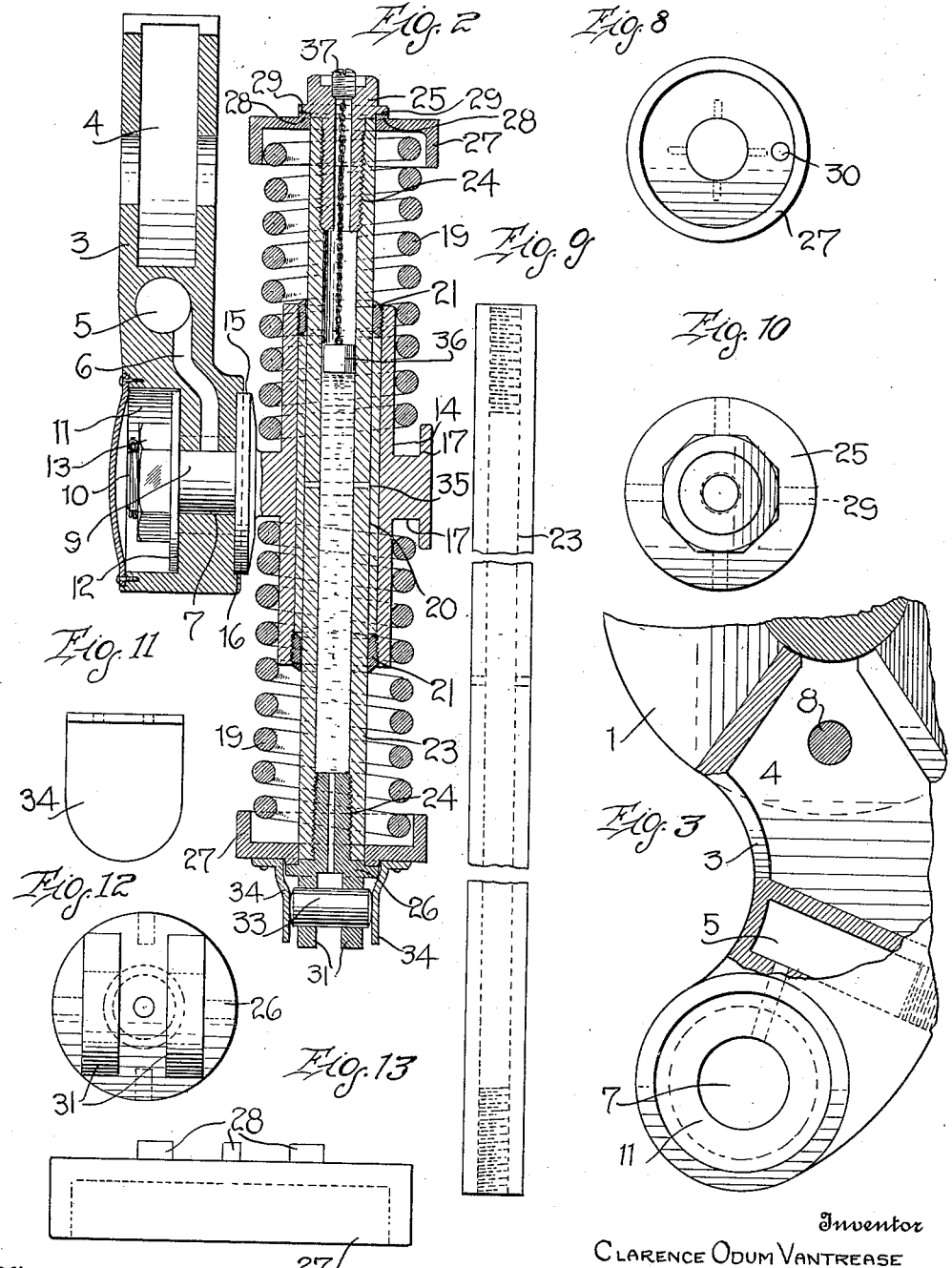

UNITED STATES PATENT OFFICE.

CLARENCE ODUM VANTREASE, OF NASHVILLE, TENNESSEE.

RESILIENT WHEEL.

1,097,829.  Specification of Letters Patent.  Patented May 26, 1914.

Application filed August 13, 1913. Serial No. 784,582.

*To all whom it may concern:*

Be it known that I, CLARENCE ODUM VANTREASE, a citizen of the United States, residing at Nashville, in the county of Davidson and State of Tennessee, have invented certain new and useful Improvements in Resilient Wheels, of which the following is a specification, reference being had to the accompanying drawings.

This invention relates to new and useful improvements in resilient wheels, and it has for its primary object a simple, durable and efficient construction of wheel of this character, whereby the use of pneumatic tires is done away with and the disadvantages incidental thereto obviated.

The invention has for a further object an improved construction of resilient wheel, the parts whereof may be easily manufactured and readily assembled, and which will not be liable to get out of order, the construction including means whereby the different parts of the wheel may be properly lubricated and always maintained in good working condition.

A still further object of the invention is a wheel of this type which will be light and of attractive appearance and capable of withstanding to a marked degree the shocks to which wheels of automobiles and similar vehicles are subjected in use. And the invention also aims to generally improve devices of this class so as to render them more useful and commercially desirable.

With these and other objects in view, as will more fully appear as the description proceeds, the invention consists of certain constructions, arrangements and combinations of the parts that I shall hereinafter fully describe and claim.

For a full understanding of the invention, reference is to be had to the following description and accompanying drawings, in which—

Figure 1 is a side elevation of a wheel embodying the improvements and principles of my invention. Fig. 2 is a longitudinal sectional view through one of the spokes and its correlated parts on an enlarged scale. Fig. 3 is a fragmentary section through one of the spokes. Fig. 4 is a detail view of a plug or washer, hereinafter specifically described. Figs. 5, 6 and 7 are detail views of a sleeve member employed. Fig. 8 is a detail view of one of the caps for engaging the helical springs that are used. Fig. 9 is a detail view of one of the outer spoke sections. Fig. 10 is an enlarged plan view of one of the plugs designed to be connected to one end of an outer spoke section. Fig. 11 is a detail side view of a pin holding clip. Fig. 12 is a detail view of a pivot lug. Fig. 13 is a detail side view of the cap shown in Fig. 8 but on an enlarged scale.

Corresponding and like parts are referred to in the following description and illustrated in all the views of the accompanying drawings by like reference characters.

My improved resilient wheel embodies, or may be used, with any desired construction of hub 1 and rim 2, the latter being preferably of the clencher type and designed to accommodate a solid or cushion tire of any desired type or construction, as the resilience of my wheel does not depend upon the tire, but upon the inherent construction of the wheel itself. The spokes of the wheel comprise inner spoke sections 3 which, together, with their concomitant parts, may be of any desired number, five being shown in the present instance. Preferably, the inner spoke sections 3 are hollow for a portion of their length, as indicated at 4 in Fig. 2, so as to reduce weight without sacrificing strength, and they are formed with transversely extending cavities or chambers 5, designed to receive a lubricating medium held therein by a screw plug or any desired form of closure, said chambers 5 communicating with ducts or passages 6 which lead to journal bearings 7. It is to be understood that these spoke sections are secured to or within the hub 1 in any desired way, as by transversely extending bolts 8 of which there may be any desired number for each spoke section.

As all of the inner spoke sections and their correlated parts are alike, a description of one will suffice for the others. Reference is to be particularly had to Fig. 2. It will be seen that there is mounted in the journal bearing 7 a trunnion 9, which is formed with a screw threaded extremity 10 passing out into a relatively large cavity 11 formed in the inner spoke section 3, a washer 12 being slipped upon the threaded extremity 10 of the trunnion and a nut 13 being screwed thereon up against the washer so as to securely hold the trunnion in place for a partial rotation about its longitudinal axis. Preferably, the nut 13 is cottered, as shown. The trunnion is lubricated by means of the lubricating medium contained within the chamber 5 and the passage 6 which establishes communication between said chamber and the journal bearing 7.

The trunnion 9 is formed on one end of a sleeve member 14 which is shown in detail in Figs. 5, 6 and 7, and which comprises a bearing plate or disk 15 which fits within an annular recess 16 formed in one face of the inner hub section 3 concentric to the journal bearing 7, and it also comprises oppositely facing annular cups 17, each of which is formed with a socket 18 designed to receive one end of a helical spring 19, the springs being arranged in pairs, as clearly illustrated in Fig. 2 in longitudinal alinement with each other. The arrangement of these springs will be hereinafter more specifically described.

Mounted within the sleeve member 14 is a preferably bronze cylindrical bushing 20 and at the ends of this bushing and preferably interposed between are packing rings 21 which are screwed into the ends of the sleeve member, as clearly illustrated in the drawings. One of these packing rings is shown in detail in Fig. 4, where it is illustrated as provided with kerfs or recesses 22 for the reception of a tool whereby it may be easily screwed into and out of position. Slidingly mounted within the bushing 20 is the outer spoke section 23, which is designed to receive the threaded shanks of tubular plugs designated 25 and 26, respectively. The plug 26 is the outer plug, that is, the one contiguous to the rim 2 of the wheel.

Referring now more specifically to the springs 19, it will be seen that they are received at their outer or more distant ends within caps 27, said caps being formed on their outer faces with lugs 28 which are radially disposed in the present instance and which are designed to be received in radial recesses 29 in the plugs 25 and 26 respectively, each of these caps being formed with a socket 30 to receive the axially projecting extremity of the adjacent spring, this interengagement between the plugs and caps preventing the latter from turning. The outermost plug 26 constitutes a pivot lug, and to that end it is formed on one face with laterally spaced and transversely apertured ears 31 designed to receive between them a transversely apertured lug 32 welded or otherwise secured to the inner side of the rim 2. A pin 33 extends through the apertured ears 31 and the lug 32, said pin being held in place in any desired way, but preferably by means of spring retaining clips or members 34 preferably formed of steel and secured in any desired way to the adjacent cap 27.

The plugs 25 and 26 are both tubular or provided with longitudinal bores, as clearly illustrated in the drawings, said bores communicating with the bore or interior wall of the outer spoke section 23, and said spoke section is formed at any desired point within the bushing 20, and preferably midway of the length of the outer spoke section with side opening ports 35 whereby the lubricating medium which is contained within the outer spoke section may pass to the exterior wall thereof and lubricate the same and the interior wall of the bushing 20. If desired, the outer spoke section may contain a weight 36 of any desired shape secured to the screw cap or closure 37 by a chain or similar flexible member and designed to pound or pack the lubricating medium and positively feed it toward the ports 35 and the bore of the plug 26, whereby the outer spoke section and the pivot pin 33 and its bearing may be at all times maintained in properly lubricated condition.

From the foregoing description in connection with the accompanying drawings, the operation of my improved resilient wheel will be apparent. In the practical use of the device, it is manifest that all shocks or jars will be effectually absorbed by the springs 19, the trunnions 9 turning as required in their bearings 7 and all of the parts effectively co-acting and combining to compensate for radial strains or stresses, whereby the wheel will be found especially desirable for use in connection with automobiles or similar vehicles and without the disadvantages which are incidental to the use of pneumatic tires.

While the accompanying drawings illustrate what I believe to be the preferred embodiment of my invention, it is to be understood that the invention is not limited thereto, but that various changes may be made in the construction, arrangement and proportions of the parts without departing from the scope of the invention as defined in the appended claims. For example, it is to be understood that the invention is not limited to any angularity or degree of angularity of the spokes or either section thereof relative to the radius of the wheel, and, as hereinbefore indicated, any desired number of spokes may be employed as well as any desired number of bolts for securing the spokes to the hub; and the inner spoke sections may be of any desired shape and not merely curved as illustrated in the accompanying drawings.

What I claim is:—

1. A resilient wheel including inner spoke sections, outer spoke sections, a rim to which the outer spoke sections are pivotally connected, said outer spoke sections being tubular and designed to contain a lubricant and formed intermediate of their ends with lateral ports, for the purpose specified, sleeve members in which the outer spoke sections are mounted for a longitudinally yieldable movement, said sleeve members having an axially movable connection with the inner spoke sections, weights contained within the outer spoke sections, and tensioning means cooperating with the outer spoke sections and the sleeve members whereby to hold the same in yielding relation to each other, as and for the purpose set forth.

2. A resilient wheel including inner spoke sections, outer spoke sections, a rim to which the outer spoke sections are pivotally connected, said outer spoke sections being tubular and designed to contain a lubricant and formed intermediate of their ends with lateral ports for the purpose specified, sleeve members in which the outer spoke sections are mounted for longitudinally yieldable movement, said sleeve members having an axially movable connection with the inner spoke sections, tensioning means cooperating with the outer spoke sections and the sleeves whereby to hold the same in yielding relation to each other, and feeding means contained within the outer spoke sections for the lubricant contained therein operable independently of the relative movements of the spoke sections and the sleeves.

3. A resilient wheel including inner spoke sections, outer spoke sections, a rim to which the outer spoke sections are pivotally connected, said outer spoke sections being tubular and designed to contain a lubricant and formed intermediate of their ends with lateral ports, for the purpose specified, sleeve members in which the outer spoke sections are mounted for longitudinally yieldable movement, said sleeve members having an axially movable connection with the inner spoke sections, tensioning means cooperating with the outer spoke sections and the sleeves whereby to hold the same in yielding relation to each other, and a pounding means contained within the outer spoke sections serving to force the lubricant contained therein through the ports and operable independently of the relative movements of the spoke sections and the sleeves.

4. A resilient wheel including inner spoke sections, outer spoke sections, the outer spoke sections being tubular, a rim to which the outer spoke sections are pivotally connected, sleeve members in which the outer spoke sections are mounted for a longitudinally sliding movement, the tubular outer spoke sections being designed to contain a lubricating medium and lengthwise directed ports adjacent their pivots and being formed intermediate of their ends with transverse ports, for the purpose specified, said sleeve members being provided with trunnions, the inner spoke sections being formed with journal bearings in which said trunnions are mounted for a partial rotary movement and the inner spoke sections being formed with chambers for the reception of a lubricant and with passages leading from said chambers to the journal bearings.

In testimony whereof I hereunto affix my signature in the presence of two witnesses.

CLARENCE ODUM VANTREASE.

Witnesses:
 ANNIE VANTREASE,
 M. C. LYDDANE.

---

Copies of this patent may be obtained for five cents each, by addressing the "Commissioner of Patents, Washington, D. C."